United States Patent Office 3,525,786
Patented Aug. 25, 1970

3,525,786
METHOD OF MANUFACTURING INSULATORS FOR MULTIPLE CONDUCTOR CONNECTORS
John E. Meyn, Anaheim, Calif., assignor to Microdot, Inc., South Pasadena, Calif., a corporation of California
Filed Apr. 8, 1966, Ser. No. 541,162
Int. Cl. B29f 1/10; B32b 1/10
U.S. Cl. 264—135                    11 Claims

ABSTRACT OF THE DISCLOSURE

The product is a multiple-bore rigid insulator of thermosetting material with a multiple-bore elastomeric grommet united therewith. The rigid insulator is placed in a mold with multiple core pins extending from the multiple bores thereof through a mold cavity. The face of the rigid insulator is coated with uncured thermosetting adhesive and then, with the mold heated, uncured elastomeric material is extruded under heat and pressure into the mold cavity to form the grommet around the core pins and to bond the resultant grommet to the face of the insulator. When the product is ejected from the mold and from the core pins, the grommet assumes a desirable tapered configuration.

---

This invention relates to the fabrication of an object comprising two plastic bodies bonded together with the strength of the bond greater than the strength of the materials of the two bodies. The initial practice of the invention is directed specifically to the problem of providing a multiple bore insulator with an extension in the form of an elastomeric grommet bonded integrally thereto.

Such an assembly of two united bodies enclosed by a suitable metal sleeve structure is commonly employed in a multiple-conductor electrical connector with either pin elements or complementary socket elements mounted in the multiple bores. It is desirable that the insulator which forms the base portion of such an assembly be relatively rigid and strong but that the grommet which forms the forward portion be made of yieldable elastomeric material. For this reason, it is desirable to mold two bodies of two different materials, the insulator being made of rigid material such as epoxy resin and the grommet being made of a suitable elastomer such as silicone rubber.

One problem to be met in the fabrication of such a composite structure is to provide a joint or bond between the two different bodies that is at least as strong as the material of the two bodies. Another problem is to eliminate any possibility of voids at the interface of the two bodies. Since the materials selected for the insulator and the grommet respectively are of dielectric strength that greatly exceeds the dielectric strength of air, any air-filled space at the interface is a serious defect that may result in voltage flashover between the closely spaced conductors.

A third problem is to bond together a multiple-bore insulator and a complementary multiple-bore grommet with accurate alignment of the two sets of bores. Since multiple-conductor connectors are commonly of compact design with closely spaced conductors, permissible tolerances are necessarily restricted. For example, such a composite body of an overall diameter of .750" may be provided with sixty-one bores, the diameter of the matching bores at the interface being .054–.056", with the bores arranged in staggered rows with center-to-center spacing in each row of .080–.082", the perimeter-to-perimeter spacing of the bores in a row being .024–.028". It is difficult to preform the two bodies and then match the two sets of sixty-one bores with acceptable precision and especially so for quantity production at economical fabrication cost.

The solution to these problems is found in certain concepts which work together for the purpose of the invention. One concept is that the task of bonding the insulator and grommet together may be simplified by first molding the insulator and then using the insulator as part of a mold for forming the grommet, the grommet being in effect molded against the insulator. A second concept is to employ a suitable adhesive at the interface of the two bodies as a primer coat, the primer coat being compatible with the materials of both bodies to make possible a bond of especially high strength. A third concept is that elimination of voids at the interface may be promoted by employing two successive primary coats, the first coat being cured in advance to fill in minute surface depressions and to provide a smooth surface for the application of the second coat.

Another concept is to take advantage of the fact that injection molding of the grommet against the insulator inherently results in elevated temperature and high pressure at the interface so that any prime coat that is present at the interface is subjected to such heat and pressure. Under heat and pressure a suitable primary coat that is compatible with the materials of both of the two bodies creates fusion at the interface to make the joint between the two bodies stronger than the materials of the two bodies. Still another concept is that injection molding of the grommet against the insulator is possible if the insulator is made of a thermosetting resin that is capable of withstanding the heat and pressure, for example epoxy reinforced by embedded glass fibers.

A further concept is that in the operation of molding the grommet extension, the insulator may serve in effect as a jig to hold multiple cores for molding the multiple bores in the grommet. Thus core pins may extend through the insulator into the grommet to form the multiple bores in the grommet. A still further concept is to mount the core pins in the mold in a floating manner with an appreciable degree of freedom for lateral movement of the indivdual core pins, to make the core pins capable of self alignment with the bores in the insulator.

An unexpected advantage of the invention relates to the difficulty that is usually encountered in telescoping a snug fitting sleeve or ferrule over the grommet. If the grommet is made of a material such as silicone rubber that shrinks as it cures in the mold, the fact that one end of the grommet is anchored face-to-face to the rigid insulator results in the grommet tapering towards its outer end. This taper greatly facilitates telescoping a sleeve or ferrule over the grommet.

Another advantage of the invention is that the core pins may be circumferentially recessed or grooved to result in the formation of restrictions in the bores of the grommet. Since the grommet is made of elastomeric material the resilient restrictions function in the same manner as small O-rings to form seals around the conductors or contact elements that are inserted into the bores.

The various features and advantages of the invention may be understood from the following detailed description and the accompanying drawing.

In the drawing, which is to be regarded as merely illustrative:
FIG. 1 is a side elevation of the presently preferred embodiment of the invention, the view being partly in section;
FIG. 2 is an end elevation of the embodiment shown in FIG. 1; and
FIG. 3 is a simplified sectional view of apparatus that may be employed for the molding operation.

Aug. 25, 1970     J. E. MEYN     3,525,786
METHOD OF MANUFACTURING INSULATORS FOR
MULTIPLE CONDUCTOR CONNECTORS
Filed April 8, 1966
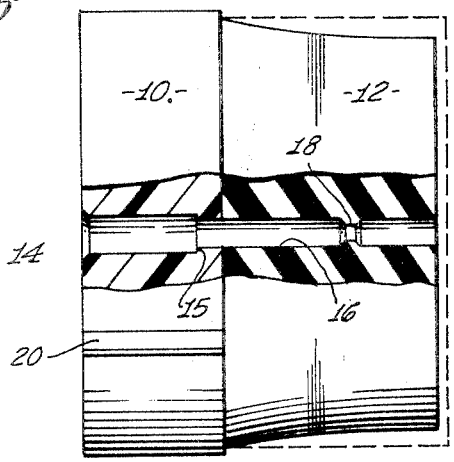
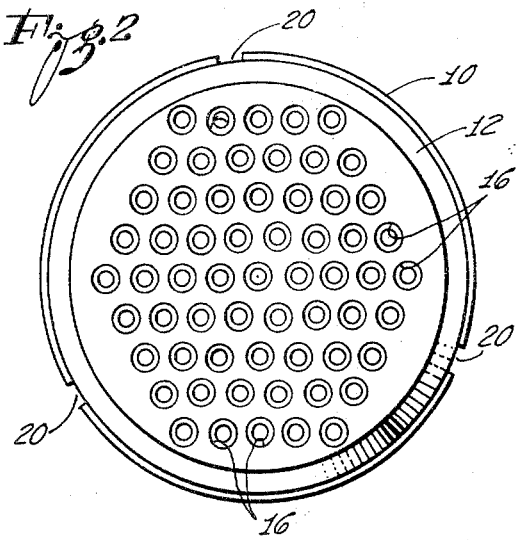
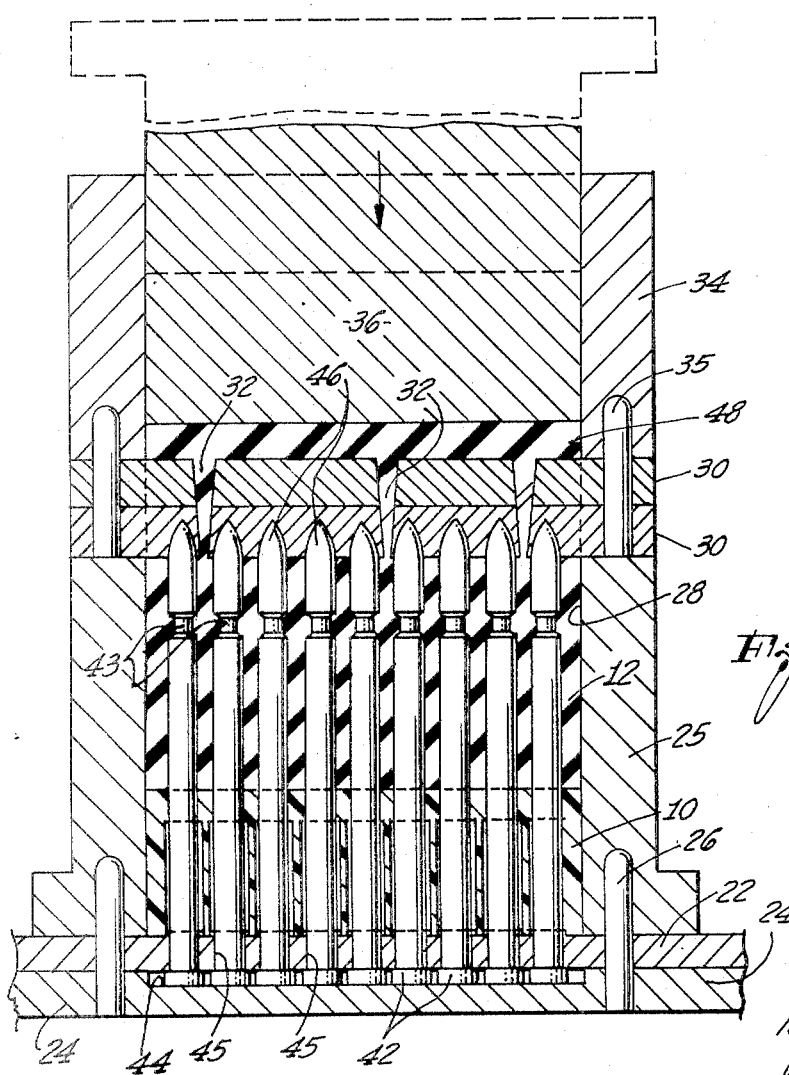
INVENTOR
JOHN E. MEYN
ATTORNEYS Initial downward movement of the ram 36 to extrude the silicone rubber into the mold cavity 28 is carried out at a pressure of approximately 700 p.s.i. and after the mold cavity is completely filled the pressure applied by the ram 36 is increased to 1,000 p.s.i. and is held at that level for fifteen seconds. Pressures will vary with different size parts. At the end of the fifteen seconds the pressure applied by the ram 36 is allowed to drift for a cure period of approximately five minutes and then the molded product is removed from the mold structure and from the core pins 40. As soon as the composite body is removed from the mold structure it is placed in an oven at 350° F. for an eight hour final cure period. The final product may then be cleaned and inspected.

The heat and pressure involved in the described procedure of injection molding the grommet against the forward face of the insulator causes fusion of the materials at the interface between the insulator and the grommet to result in the desired high strength bond.

The silicone rubber that forms the grommet 12 shrinks as it cures but the shrinkage is opposed by the face-to-face bonding of the grommet to the insulator. As a result, the grommet assumes the highly desirable tapered configuration that cannot be duplicated by any other molding technique. It is to be noted that although the grommet is tapered longitudinally the bores in the grommet are of uniform diameter because of the presence of the core pins during the cure period.

My description in specific detail of the presently preferred practice of the invention will suggest various changes, substitutions and other departures from my disclosure within the spirit and scope of the appended claims.

I claim:

1. A method of fabricating a rigid plastic insulator with an elastomeric grommet united with an end face thereof and with multiple bores through the insulator matching corresponding multiple bores through the grommet, characterized by the steps of:
   molding a rigid insulator of plastic material with multiple bores therethrough;
   coating said end face of the insulator with an uncured thermosetting adhesive that is compatible with the materials of the insulator and the grommet;
   mounting core pins in the bores of the insulator with the core pins extending from the coated end face of the insulator;
   enclosing the insulator together with the core pins to form a mold cavity of the configuration of the desired grommet with the coated face of the insulator forming one side of the cavity and with the core pins extending completely across the cavity;
   filling the mold cavity with uncured thermosetting elastomeric material to surround the core pins;
   curing said coating and the elastomeric material to form a composite body comprising the insulator with an elastomeric grommet united therewith; and
   withdrawing the composite body from the mold cavity and from the core pins, the curing of the elastomeric material and the withdrawal from the core pins resulting in shrinking of the elastomeric grommet to a desirable tapered configuration.

2. A method as set forth in claim 1 in which the insulator is made of thermosetting resin.

3. A method as set forth in claim 2 in which the insulator material is essentially epoxy.

4. A method as set forth in claim 3 in which the material of the grommet is a silicone rubber.

5. A method as set forth in claim 6 in which the adhesive comprises essentially diallyl phthalate.

6. A method as set forth in claim 1 in which the material of the insulator is selected from a group consisting of epoxy resin, diallyl phthalate, melamine, phenol formaldehyde resin and alkyd mold compound.

7. A method as set forth in claim 1 in which the operation of coating of the end face of the insulator comprises the steps of:
   applying a first coat of primer to the end face;
   curing the first coat to form a hard smooth surface;
   applying a second coat of the primer to the cured first coat; and
   both filling the cavity with elastomeric material and applying high pressure to the elastomeric material in the cavity before the second coat cures.

8. A method as set forth in claim 7 in which the insulator material is essentially epoxy and the material of the prime coating is essentially diallyl phthalate.

9. A method as set forth in claim 8 in which the material of the grommet is silicone rubber.

10. A method as set forth in claim 1 in which portions of the core pin that are exposed in the mold cavity have circumferential recesses to form corresponding restrictions in the bores of the grommet.

11. A method as set forth in claim 1 which includes the further step of maintaining the molded product in the cavity at an elevated temperature for a period of time to cure the molded material.

References Cited

UNITED STATES PATENTS

| | | | |
|---|---|---|---|
| 2,337,555 | 12/1943 | Hosking | 264—135 X |
| 2,565,803 | 8/1951 | Danielson et al. | 264—135 X |
| 2,949,641 | 8/1960 | Quackenbush | 264—277 X |
| 3,251,018 | 5/1966 | Bennett | 264—250 X |
| 3,334,409 | 8/1967 | Shneider et al. | |

ROBERT F. WHITE, Primary Examiner

R. R. KUCIA, Assistant Examiner

U.S. Cl. X.R.

264—265, 277; 156—327